United States Patent
DeSousa (10) Patent No.: US 11,621,642 B2
(45) Date of Patent: Apr. 4, 2023

(54) INSULATED DC/DC CONVERTER WITH MAGNETIC COMPONENT INCLUDING PRIMARY PART AND SECONDARY PART SEPARATEED BY ELECTRICAL INSULATION BARRIER

(71) Applicant: VALEO SYSTEMES DE CONTROLE MOTEUR, Cergy Pontoise (FR)

(72) Inventor: Luis DeSousa, Eragny sur Oise (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 0 days.

(21) Appl. No.: 16/077,842

(22) PCT Filed: Feb. 14, 2017

(86) PCT No.: PCT/EP2017/053285
§ 371 (c)(1),
(2) Date: Aug. 14, 2018

(87) PCT Pub. No.: WO2017/140672
PCT Pub. Date: Aug. 24, 2017

(65) Prior Publication Data
US 2019/0058407 A1    Feb. 21, 2019

(30) Foreign Application Priority Data
Feb. 15, 2016 (FR) ..................................... 16 51214

(51) Int. Cl.
*H02M 3/335* (2006.01)
*H02H 1/00* (2006.01)
*H02H 7/12* (2006.01)

(52) U.S. Cl.
CPC ...... *H02M 3/33576* (2013.01); *H02H 1/0007* (2013.01); *H02H 7/1213* (2013.01); *H02M 3/33553* (2013.01); *H02M 3/33569* (2013.01)

(58) Field of Classification Search
CPC ............. H02M 3/335; H02M 3/33507; H02M 3/33592; H02M 3/33523; H02M 3/33569;
(Continued)

(56) References Cited

U.S. PATENT DOCUMENTS 7,706,153 B2 * 4/2010 Nomura ................ H02M 3/337
    363/131
7,969,752 B2 * 6/2011 Bong ................ H02M 3/33576
    363/17

(Continued)

OTHER PUBLICATIONS

International Search Report for Application No. PCT/EP2017/053285 dated May 15, 2017.

*Primary Examiner* — Gustavo A Rosario-Benitez
(74) *Attorney, Agent, or Firm* — McCormick, Paulding & Huber PLLC (57) ABSTRACT

The invention relates to an insulated DC/DC converter comprising:
a magnetic component having a primary part and a secondary part separated by an electrical insulation barrier;
breakers linked to the primary part of the magnetic component allowing the magnetic component to transfer energy from the primary part to the secondary part and to store energy at the level of the primary part; and in which the secondary part of the magnetic component comprises a first arm and a second arm, each arm comprising a first breaker, a secondary and a second breaker in series; an intermediate point of the secondary of the first arm being connected to an intermediate point of the secondary of the second arm.

19 Claims, 5 Drawing Sheets

(58) Field of Classification Search
CPC ..... H02M 2001/0058; H02M 3/33576; H02M 3/33561; H02M 2001/0064; H02M 3/3353; H02M 3/33553; H02M 3/33546; H02M 3/33538; H02H 1/0007; H02H 7/1213

See application file for complete search history.

(56) References Cited

U.S. PATENT DOCUMENTS

| | | | |
|---|---|---|---|
| 8,456,867 B1 | 6/2013 | Karlsson et al. | |
| 8,966,294 B2 * | 2/2015 | Zhan | H02M 1/34 363/17 |
| 9,985,546 B2 * | 5/2018 | Jitaru | H02J 3/00 |
| 10,193,463 B2 * | 1/2019 | De Sousa | H02M 3/33576 |
| 2004/0022075 A1 * | 2/2004 | Perry | H02M 3/33592 363/21.01 |
| 2004/0179380 A1 * | 9/2004 | Yamashita | H02M 3/33569 363/52 |
| 2005/0180173 A1 * | 8/2005 | Batarseh | H02M 3/28 363/15 |
| 2005/0254266 A1 * | 11/2005 | Jitaru | H02M 3/33523 363/16 |
| 2007/0236967 A1 * | 10/2007 | Liu | H02M 1/4241 363/21.02 |
| 2009/0059622 A1 * | 3/2009 | Shimada | H02M 1/32 363/17 |
| 2012/0026767 A1 * | 2/2012 | Inoue | H02M 7/217 363/89 |
| 2014/0132066 A1 * | 5/2014 | Hirano | H02M 3/33584 307/17 |
| 2014/0177283 A1 | 6/2014 | Kim et al. | |
| 2015/0168461 A1 * | 6/2015 | Sardat | G01R 19/0046 324/127 |
| 2015/0236611 A1 * | 8/2015 | Nakazawa | H02M 7/06 363/123 |
| 2017/0063245 A1 * | 3/2017 | Takagi | H02M 1/14 |
| 2017/0163174 A1 * | 6/2017 | Sadki | H02M 3/156 |
| 2017/0222567 A1 * | 8/2017 | DeSousa | H02K 1/02 |

* cited by examiner

INSULATED DC/DC CONVERTER WITH MAGNETIC COMPONENT INCLUDING PRIMARY PART AND SECONDARY PART SEPARATEED BY ELECTRICAL INSULATION BARRIER

CROSS REFERENCE TO RELATED APPLICATION

This application is a National Stage application of International Patent Application No. PCT/EP2017/053285, filed on Feb. 14, 2017, which claims priority to French Patent Application No. 1651214, filed on Feb. 15, 2016, each of which is hereby incorporated by reference in its entirety.

TECHNICAL FIELD

The present invention relates to an insulated DC/DC converter.

BACKGROUND OF THE INVENTION

Insulated DC/DC (direct current/direct current) converters can have zero voltage switching (ZVS) or zero current switching (ZCS) which allow to reduce losses by switching during voltage conversion. These converters are therefore particularly advantageous in an automotive application where the energy resource is limited. In a vehicle, a voltage converter can be used to adapt voltage levels between several electrical networks of the vehicle or to convert a voltage between an energy source and an electric consumer embedded in the vehicle.

An insulated DC/DC converter is known from U.S. Pat. No. 5,754,413, illustrated in FIG. 1. The converter comprises two switches Q1, Q2 which are connected at the middle point thereof to a sector which comprises two transformers T, T' in series. The converter is arranged in a half-bridge. The switches Q1, Q2 control the transmission of energy through the transformers T, T' to obtain a conversion of an input voltage Ue of the converter into an output voltage Uout. Diodes D1, D2 connected to secondaries of transformers allow to rectify the output signal. The output voltage Uout is obtained by controlling the alpha duty cycle of the switches. Over a first part of a functioning period, the first switch QA1 is closed and the second switch QA2 is open; the diode D2 is blocked whereas the diode D1 is looped. Over a second part of the functioning period, the first switch QA1 is open and the second switch QA2 is closed; the diode D1 is blocked whereas the diode D1 is looped.

Figure 1:
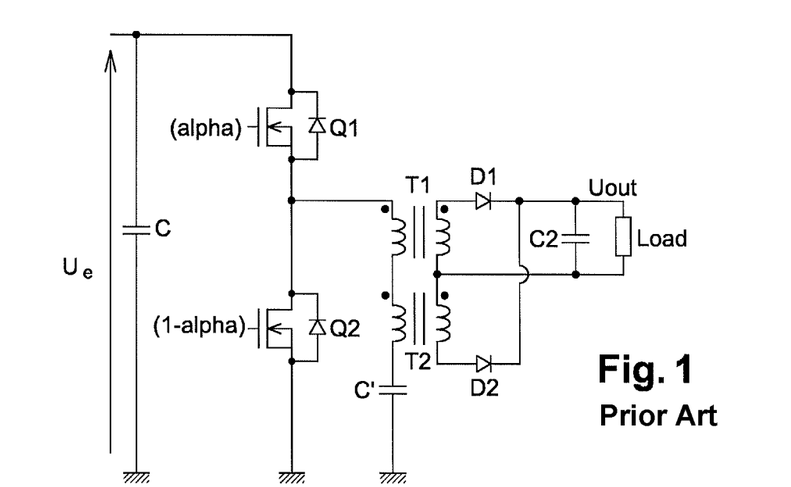
FIG. 1 illustrates an example of insulated DC/DC converter according to the prior art.

Over each part of the functioning period, the diode which is blocked sees a drop-in voltage. However, it is not ensured that this drop in voltage is equal from one part to another. A diode from the rectifier stage can therefore undergo a more significant drop in voltage than the other diode, which can lead to an oversizing of the two diodes to be certain that each one can hold the drop in voltage. The diodes D1, D2 can be replaced by switches, like MOSFETs for example, that can be controlled synchronously to decrease the drop in voltage. This imbalance over the drop in voltage limits the choice regarding switches having a more significant blocking voltage, but with an all-the-more increased conduction resistance.

Therefore, an insulated DC/DC converter is desired, comprising a magnetic component allowing to transfer energy from a primary part to a secondary part and to store energy at the primary part, and in which the drop-in voltage undergone by a rectifier component of the rectifier stage is decreased with respect to the prior art.

SUMMARY OF THE INVENTION

To this end, an insulated DC/DC converter is proposed comprising:
a magnetic component having a primary part and a secondary part separated by an electrical insulation barrier;
switches, referred to as primary side switches, linked to the primary part of the magnetic component such that the switching of the primary side switches with a duty cycle on the modulation periods allows the magnetic component to transfer the energy from the primary part to the secondary part and to store energy at the primary part, to convert an input voltage of the insulated DC/DC converter into an output voltage; and
in which the secondary part of the magnetic component comprises a first arm and a second arm, each arm comprising a first breaker, a secondary and a second switch in series; an intermediate point of the secondary of the first arm, referred to as first secondary, being connected to an intermediate point of the secondary of the second arm, referred to as second secondary.

In particular, the magnetic component allows to transfer energy from the primary part to the secondary part while storing energy at the primary part, in other words, at the same time.

With respect to the prior art, the drop in voltage is distributed over two switches instead of one single breaker. The drop in voltage seen by a switch in the secondary part of the insulated DC/DC converter is half as high as in a converter of the prior art, which decreases the blocking voltage necessary for switches of the secondary part and therefore the conduction resistance thereof. The losses by conduction in the secondary part are therefore decreased with respect to the prior art. The switches allow to control currents circulating in the secondary part. By linking the intermediate points of the secondaries, it is ensured that when the switches of an arm are open, the potential at the intermediate point of this arm is imposed by the intermediate point of the other arm. Thus, the voltage can be controlled between the intermediate point of the arm considered and the ends of the arm, and therefore the voltage at the terminals of the open switches.

According to an embodiment, the magnetic component transfers energy to one of the two secondaries according to the voltage applied at the primary part.

According to an embodiment, the magnetic component is configured such that:
over a first part of a modulation period, a first part of the primary part transfers an energy to the first secondary, and a second part of the primary part produces an inductance storing energy;
over a second part of the modulation period, the second part of the primary part transfers an energy to the second secondary, and the first part of the primary part produces an inductance storing energy.

According to a variant, the switches of the first arm are configured to be looped over the first functioning part and open over the second functioning part; and the switches of the second arm are configured to be looped over the second functioning part and open over the first functioning part.

According to an embodiment, in each arm of the secondary part, the switches are configured to be simultaneously in a same state and to be in a different state from that of the switches of the other arm.

According to an embodiment, the ends of the arms of the secondary part are linked to each other, a first end being configured to be connected to the ground of the secondary part, a second end being configured to be connected to the output of the voltage converter.

According to an embodiment, said secondaries of the magnetic component are not magnetically coupled to each other, said secondaries being magnetically coupled to the primary part.

According to an embodiment, the primary side switches are configured to function with a substantially constant duty cycle; said insulated DC/DC converter comprising at least one other switch configured to control the output voltage of the insulated DC/DC converter by controlling the voltage delivered by said primary side switches.

According to an embodiment, the primary side switches are configured such that the duty cycle thereof is substantially equal to 50%.

According to an embodiment, the converter comprises a short-circuit detector, configured to:
  detect a short-circuit in one of said secondary side switches in the secondary part;
  open the other switch of the secondary side arm to which the short-circuit switch belongs so as to neutralise this short-circuit.

BRIEF DESCRIPTION OF THE DRAWINGS

The invention will be best understood by making reference to the drawings, in which.

DETAILED DESCRIPTION OF THE INVENTION

Figure 2:
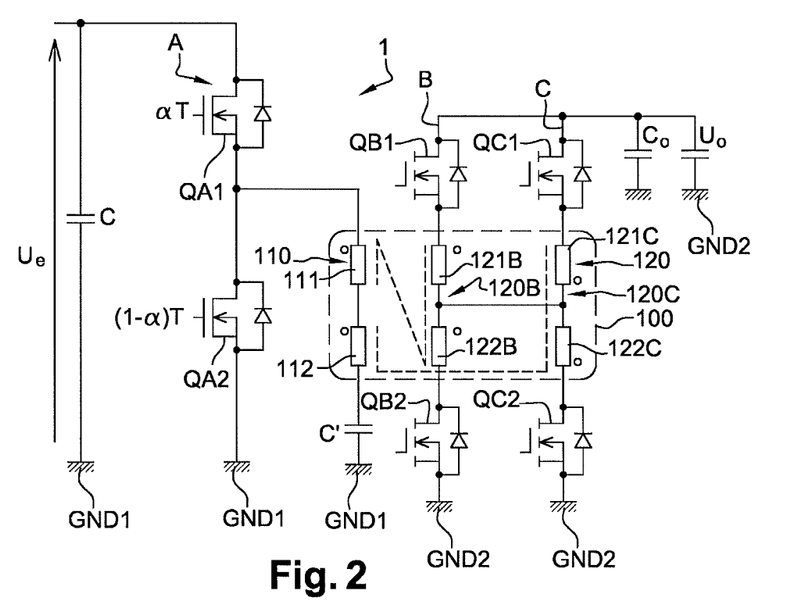
FIG. 2 illustrates an example of insulated DC/DC converter according to the invention.

FIG. 2 presents an example of insulated DC/DC converter 1 according to an embodiment of the invention.

The insulated DC/DC converter 1 comprises a magnetic component 100 which comprises a primary part 110 and a secondary part 120 separated by an insulation barrier.

The insulated DC/DC converter 1 comprises a first arm A connected to the primary part 110 of the magnetic component 100. The arm A comprises switches QA1, QA2, in series. In particular, a succession of openings and closings of the switches QA1, QA2 allows to convert an input voltage Ue of the insulated DC/DC converter 1 into an output voltage Uout of the insulated DC/DC converter 1. In particular, a first switch QA1 is connected to the high terminal of a voltage source Ue. A second switch QA2 is connected to the low terminal of the voltage source Ue. This low terminal in particular corresponds to a first ground GND1 of the insulated DC/DC converter 1.

The switching of the switches QA1, QA2 with a duty cycle a over the modulation periods T allow the magnetic component 100 to transfer energy from the primary part 110 to the secondary part 120 and to store energy at the primary part 110, to convert an input voltage Ue of the insulated DC/DC converter 1 into an output voltage Uout. The insulated DC/DC converter 1 can comprise a capacity Cout to filter the output signal.

In particular, the middle point between the two switches QA1, QA2 of the primary side arm A is connected to an end of an arm which comprises the primary part 110 of the magnetic component 100 in series with a capacity C'. In particular, this arm is connected to the other end thereof to the ground GND1 of the primary part 110. The insulated DC/DC converter 1 might not need this capacity C'. The capacity C' allows to remove the DC component of the signal transmitted by the primary part 110 to the secondary part 120, in particular in the case of a half-bridge structure. The capacity C' can be removed in a full-bridge structure.

In the secondary part 120 of the magnetic component 100, a first arm, referred to as first secondary side arm B, comprises a first switch QB1, a secondary 120B and a second switch QB2 in series. A second arm, referred to as second secondary side arm C, comprises a first switch QC1, a secondary 120C and a second switch QC2 in series. In particular, in each secondary side arm B, C, the secondary 120B, 120C is connected in series between the first switch QA1, QB1 and the second switch QA2, QB2. In particular, the ends of the secondary side arms B, C are linked to each other, a first end being connected to the ground GND2 of the secondary part, a second end being configured to be connected to the output of the voltage converter.

In particular, the magnetic component 100 transfers energy to one of the two secondaries 120B, 120C according to the voltage applied at the primary part 110. In particular, to this end, the secondaries 120B, 120C of the magnetic component 100 are not magnetically coupled to each other, but are magnetically coupled to the primary part 110. More specifically, the secondary 120B of the first secondary side arm B is magnetically coupled to a first part 111 of the primary part 110 and the secondary 120C of the second arm C is magnetically coupled to a second part 112 of the primary part 110.

In the prior art illustrated in FIG. 1, the diodes D1, D2 are connected to the secondary side for a rectification of the signal coming from the secondaries of the magnetic component. In the insulated DC/DC converter 1, the diodes are replaced by secondary side switches QB1, QB2, QC1, QC2. To conserve the rectification function, the secondary side switches QB1, QB2, QC1, QC2 keep a similar functioning to that of the diodes D1, D2. In other words, the secondary side switches QB1, QB2, QC1, QC2 are open, respectively closed, over times where the diodes would have had an open state, respectively closed. To this end, in the example of the method, the switches QB1, QB2 of the first secondary side arm B have the same state, closed or open, as the first switch QA1 of the primary side arm A; and the switches QC1, QC2 of the second secondary side arm C have the same state, closed or open, as the second switch QA2 of the primary side arm A. In particular, in each secondary side arm B, C, the switches QB1, QB2; QC1, QC2 are configured to be simultaneously in the same state. In particular, during a voltage conversion by the insulated DC/DC converter 1, the switches QB1, QB2 of the first secondary side arm B are in a different state from that of the switches QC1, QC2 of the second secondary side arm C.

The secondaries 120B, 120C are connected to each other at a respective intermediate point. In other words, the intermediate points of the secondary 120B of the first secondary side arm B and of the secondary 120C of the second secondary side arm C have the same potential. This can particularly be achieved by linking them with an electrical wire. The intermediate point of the secondary 120B of the arm B therefore defines a first part 121B and a second part 122B of the secondary of the arm B; and the intermediate point of the secondary 120C of the arm C therefore defines a first part 121C and a second part 122C of the secondary of the arm C.

In this example, the intermediate points are respective middle points of the secondary 120B of the first secondary side arm B and of the secondary 120C of the second secondary side arm C. In other words, the two secondaries 120B, 120C are connected at the respective middle points thereof.

Figure 3:
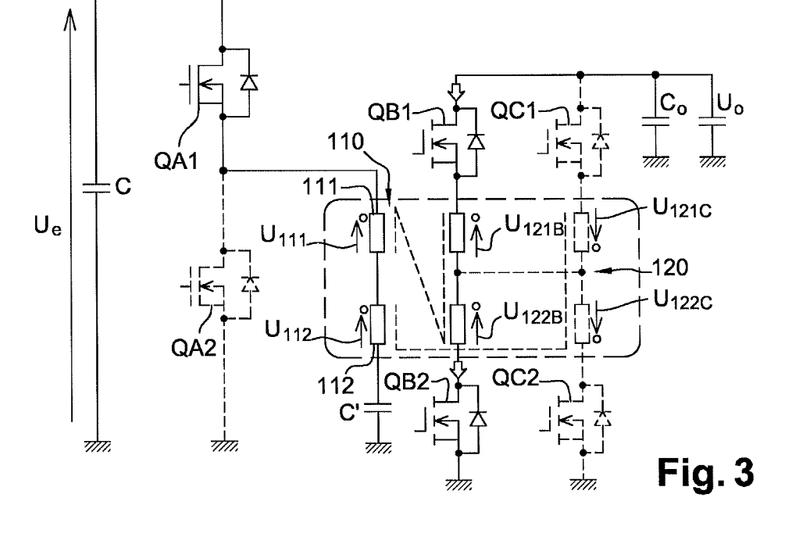
FIG. 3 illustrates a first state of the insulated DC/DC converter illustrated in FIG. 2 during the functioning thereof.
Figure 4:
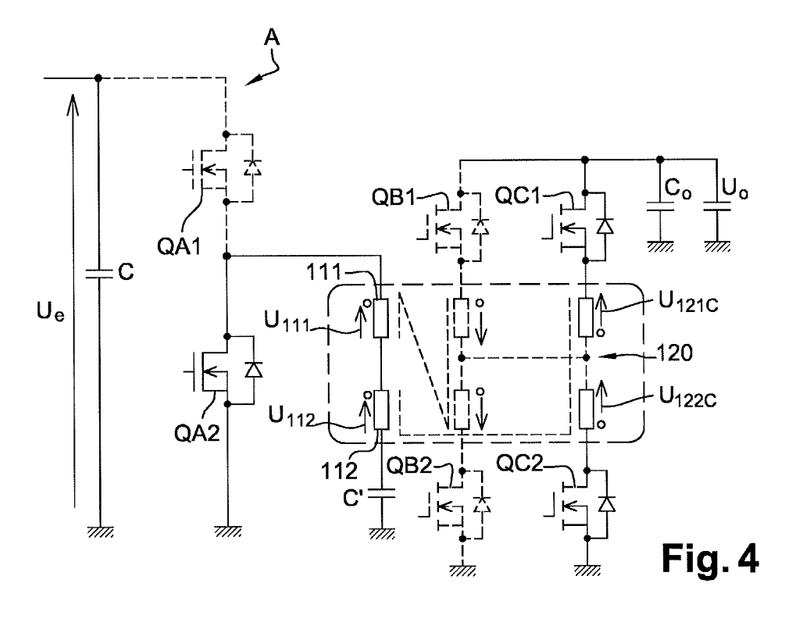
FIG. 4 illustrates a second state of the insulated DC/DC converter illustrated in FIG. 2 during the functioning thereof.

The advantage of the secondary part 120 in the insulated DC/DC converter 1 will be best understood by defining a functioning of the insulated DC/DC converter 1 in relation to the FIGS. 3 and 4.

The switches QA1, QA2 of the first primary side arm A have a duty cycle α over a modulation period T so as to transfer an energy through the magnetic component 100. The switches QA1, QA2 are particularly controlled by a pulse width modulation over the modulation period T. The durations of first and second functioning parts are defined by the duty cycle α of the switches QA1, QA2.

On a first functioning part illustrated in FIG. 3, of duration $\alpha T$, in other words, over a first part of the modulation period T, the first primary side switch QA1 is closed and the second primary side switch QA2 is open. The first functioning part has a duration $\alpha T$, where $\alpha$ is the duty cycle applied to the first switch QA1 of the primary side arm A and T is the modulation period. Over the first part of the functioning period, the switches QC1, QC2 of the second secondary side arm C are open, whereas the switches QB1, QB2 of the first secondary side arm B are closed. Only the first part 111 of the primary part 110 can therefore transfer energy to the secondary part 120. Thus, the second part 112 of the primary part 110 produces an inductance storing energy and the first part 111 of the primary part 110 transfers an energy to the secondary 120B of the first secondary side arm B. The second part 112 of the magnetic component 100 functions as an inductance, thanks in particular to a magnetising inductance linked to the second part 112 of the primary part 100. The first part 111 of the primary part 110 and the secondary 120B of the first secondary side arm B produce two coupled inductances, by which energy is transferred between the primary part 110 and the secondary part 120.

In this first part, the voltage at the terminals of the arm of the primary part 110 is equal to the input voltage Ue. The switches QC1, QC2 of the second secondary side arm C being open, no current circulates in the second secondary side arm C. The switches QB1, QB2 of the first secondary side arm B being closed, a current can therefore circulate in the first secondary side arm B. The voltage at the terminals of the secondary 120B of the first secondary side arm B is equal to the output voltage Uo. The voltage $U_{111}$ at the terminals of the first part 111 of the primary part 110 therefore is N×Uo, where N is the transformation ratio between the secondary 120B of the first secondary side arm B and the first part 111 of the primary part 110. The energy at the terminals of the first part 111 of the primary part 110 is transferred to the secondary part 120, in particular to the secondary 120B of the first secondary side arm B.

The voltage $U_{112}$ at the terminals of the second part 112 of the primary part 110 is equal to Ue−N×Uo−Uc', where Uc' is the voltage at the terminals of the capacity C'. The voltage $U_{112}$ allows a storage of energy at the magnetising inductance of the second part 112 of the primary part 110. To understand the invention, it is considered that the transformation ratio between the first part 111 of the primary part 110 and the secondary 120B of the first secondary side arm B and that between the second part 112 of the primary part 110 and the secondary 120C of the second secondary side arm C are the same. However, these transformation ratios could be different.

The voltage $U_{121_B}$ at the terminals of the first part 121B of the secondary 120B of the first secondary side arm B is equal to Uo/2, likewise the voltage $U_{122_B}$ at the terminals of the second part 122B of the secondary 120B of the first secondary side arm B, by considering the resistance Ron of the switches QB1, QB2 as marginal. The voltage $U_{121_C}$ at the terminals of the first part 121C of the secondary 120C of the second secondary side arm C is equal to $U_{112}/2N$, likewise the voltage at the terminals of the second part 122C of the secondary 120C of the second secondary side arm C. Given that the intermediate point of the secondary 120C of the second secondary side arm C is connected to the middle point of the secondary 120B of the first secondary side arm B, it appears that the voltage at the terminals of the first switch QA1C of the second secondary side arm C is equal to the voltage at the terminals of the second switch QA2C of the second secondary side arm C. Thus, the drops in voltage at the terminals of the first switch QA1C and of the second switch of the second secondary side arm C are equal. This allows a consistent wear and tear of these switches QA1C, QA2C. In addition, the voltage at the terminals of each one of the switches QA1C, QA2C is half that as at the terminals of the diode D2 in the prior art illustrated in FIG. 1, as in the insulated DC/DC converter 1 in FIG. 2, the drop in voltage is distributed over two switches QA1C, QA2C.

Over a second functioning part illustrated in FIG. 4, of duration $(1-\alpha)T$, in other words, over a second part of the modulation period T, the first primary side switch QA1 is open and the second primary side switch QA2 is closed. Over the second functioning part, the switches QC1, QC2 of the second secondary side arm C are closed, whereas the switches QB1, QB2 of the first secondary side arm B are open. Only the second part 112 of the primary part 110 can therefore transfer energy to the secondary part 120. Thus, the first part 111 of the primary part 110 produces an inductance storing energy, and the second part 112 of the primary part 110 transfers an energy to the secondary 120C of the second secondary side arm C. The first part 111 of the magnetic component 100 functions as an inductance thanks in particular to a magnetising inductance linked to the first part 111 of the primary part 100. The second part 112 of the primary part 110 and the secondary 120C of the second secondary side arm C produce two coupled inductances, by which the energy is transferred between the primary part 110 and the secondary part 120.

In this second part, the voltage at the terminals of the arm of the primary part 110 is zero. The switches QB1, QB2 of the first secondary side arm B being open, no current circulates in the first secondary side arm B. The switches QC1, QC2 of the second secondary side arm C being closed, a current can therefore circulate in the second secondary side arm C.

The voltage at the terminals of the secondary 120C of the second secondary side arm C is equal to the output voltage Uo. The voltage $U_{112}$ at the terminals of the second part 112 of the primary part 110 is therefore N×Uo, where N is the transformation ratio between the secondary 120C of the second secondary side arm C and the second part 112 of the primary part 110. The energy at the terminals of the second part 112 of the primary part 110 is transferred to the secondary part 120, in particular to the secondary 120C of the second secondary side arm C. The voltage $U_{111}$ at the terminals of the first part 111 of the primary part 110 is equal to −N×Uo−Uc', where Uc' is the voltage at the terminals of the capacity C'. The voltage $U_{111}$ allows a storage of energy at the magnetising inductance of the first part 111 of the primary part 110.

The voltage $U_{121C}$ at the terminals of the first part 121C of the secondary 120C of the second secondary side arm C is equal to Uo/2, likewise the voltage $U_{122C}$ at the terminals of the second part 122C of the secondary of the second secondary side arm C, by considering the resistance Ron of the switches as marginal. The voltage $U_{121B}$ at the terminals of the first part 121B of the secondary 120B of the first secondary side arm B is equal to $U_{111}/2N$, likewise the voltage $U_{122B}$ at the terminals of the second part 122B of the secondary 120B of the first secondary side arm B. Given that the intermediate point of the secondary 120B of the first secondary side arm B is connected to the middle point of the secondary 120C of the second secondary side arm C, it appears that the voltage at the terminals of the first switch QA1B of the first secondary side arm B is equal to the voltage at the terminals of the second switch QA2B of the first secondary side arm B. Thus, the drops in voltage at the terminals of the first switch QA1B and of the second switch QA2B of the first secondary side arm C are equal. This allows a consistent wear and tear of these switches QA1B, QA2B. In addition, the voltage at the terminals of each one of the switches QA1C, QA2C is half that as at the terminals of the diode D1 in the prior art illustrated in FIG. 1, as in the insulated DC/DC converter 1 in FIG. 2, the drop in voltage is distributed over two switches QA1C, QA2C.

Thus, the drop in voltage seen by a switch QA1B, QA2B, QA1C, QA2C in the secondary part 120 of the insulated DC/DC converter 1 is half that in a converter of the prior art, which decreases the wear and tear of the insulated DC/DC converter 1 with respect to the prior art.

According to a variant, the intermediate point is different from the middle point. In the first functioning part, the drops in voltage at the terminals of the first switch QA1C and of the second switch QA2C of the second secondary side arm C are not equal, but the ratio thereof remains constant over the instances of the first functioning part. Likewise, in the second functioning part, the drops in voltage at the terminals of the first switch QA1B and of the second switch QA2B of the first secondary side arm B are not equal, but the ratio thereof remains constant over the instances of the second functioning part. This can be advantageous when the first secondary side switches QA1B, QA1C can support a higher voltage than the second switches QA2B, QA2C, or vice versa.

Figure 5:
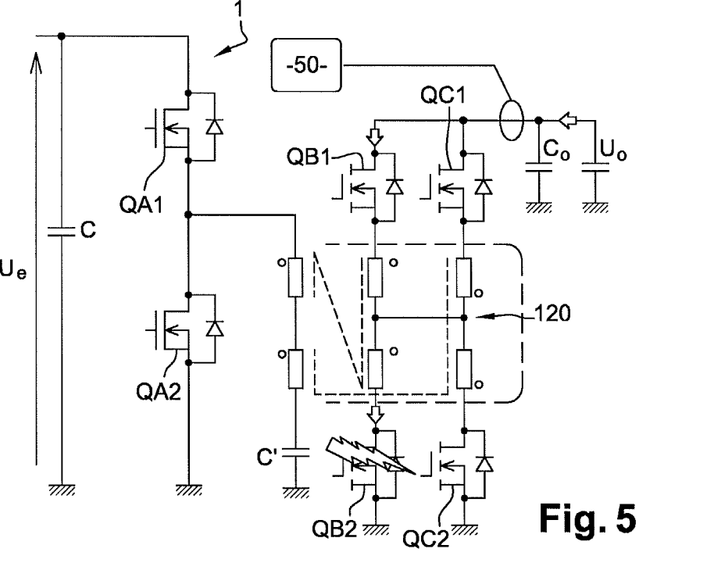
FIG. 5 illustrates an example of short-circuit detection in the insulated DC/DC converter illustrated in FIG. 2.

In the insulated DC/DC converter 1, the secondary part 120 is, for example, adapted to make the insulated DC/DC converter 1 safe in case of a failure, such as an internal short-circuit at the insulated DC/DC converter 1. In an example illustrated in FIG. 5, a detector 50 detects a short-circuit in the secondary part 120, in particular by measuring a current delivered at the output of the secondary part 120. When a short-circuit is detected, for example, on a switch QA2B of the secondary part 120, the other switch QA1B of the corresponding arm B can be controlled by opening so as to neutralise this short-circuit. Thus, a safe state of the insulated DC/DC converter 1 is easily obtained.

Figure 6:
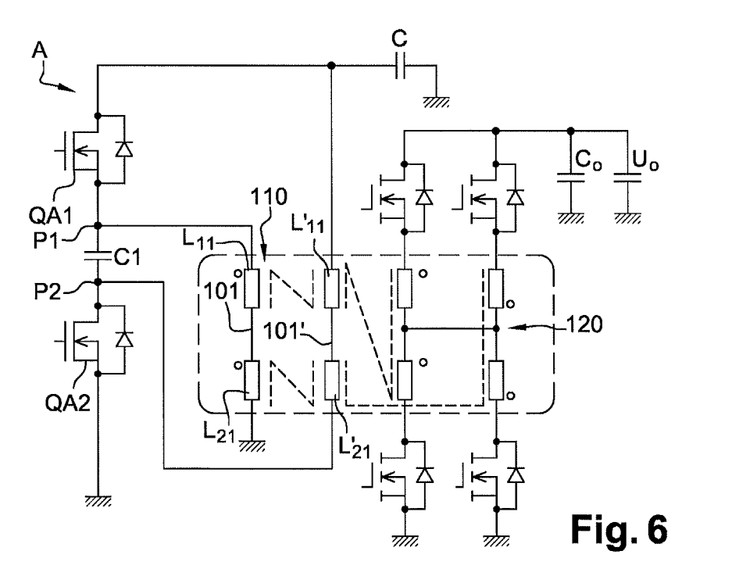
FIG. 6 illustrates another example of insulated DC/DC converter according to the invention.

The magnetic component 100 could comprise several arms in the primary part 110 to which the primary side arm A would be connected. FIG. 6 illustrates an example in which the primary part 110 comprises several primary circuits. A first capacity C1 is in series with the two switches QA1, QA2 of the first primary side arm A and situated between the switches QA1, QA2. Thus, the first capacity C1 has a first terminal connected to the first switch QA1 at a connecting point P1, and a second terminal connected to the second switch QA2 at a second connecting point P2. In particular, the first capacity C1 is connected to the first switch MA1 at the source electrode of the first switch QA1, and it is connected to the second switch QA2 at the drain electrode of the second switch QA2. In particular, the magnetic component 100 comprises a first primary circuit 101, a second primary circuit 101' separated from each other by electrical insulation barriers. In particular, the first primary circuit 101 forms a sector of which one end is connected to the first connecting point P1 and of which the other end is connected to an end terminal, referred to as second end terminal, of the first primary side arm A. The second end terminal corresponds to the terminal of the second switch QA2 which is not connected to the first capacity C1. And the second primary circuit 101' forms a sector of which one end is connected to the second connecting point P2 and of which the other end is connected to an end terminal, referred to as first end terminal, of the first primary side arm A. The first end terminal corresponds to the terminal of the first switch QA1 which is not connected to the first capacity C1.

In particular, the first primary circuit 101 has a first inductance L11 in series with a second inductance L21. In particular, the positive terminal of the first inductance L11 is connected to the first connecting point P1 and the positive terminal of the second inductance L21 is connected to the negative terminal of the first inductance L11. In particular, the second primary circuit 101' has a first inductance L11' in series with a second inductance L21'. In particular, the negative terminal of the first inductance L11' is connected to the first end terminal of the primary side arm A and the negative terminal of the second inductance L21' is connected to the positive terminal of the first inductance L11'. In particular, the first inductances L11, L11' of the primary circuits 101, 101' form the first part 111 of the primary part 110 of the magnetic component 100; and the second inductances L21, L21' of the primary circuits 101, 101' form the second part 112 of the primary part 110 of the magnetic component 100. The first inductances L11, L11' of the primary circuits 101, 101' are perfectly uncoupled from the second inductances L21, L21' of the primary circuits 101, 101'.

The example of the insulated DC/DC converter 1 in FIG. 6 has a similar functioning to that illustrated in FIG. 2.

Figure 7:
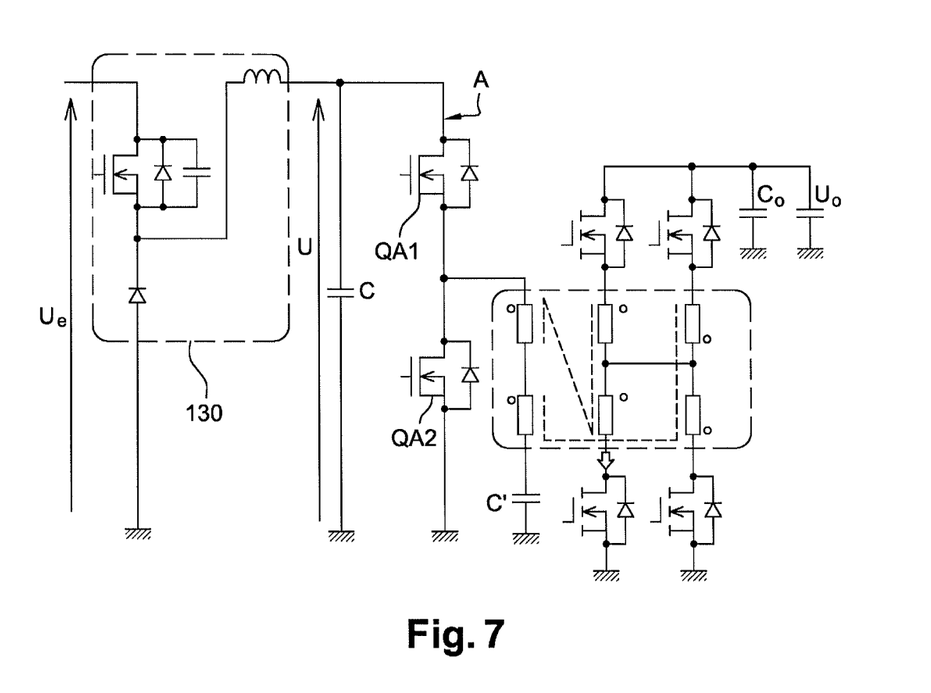
FIG. 7 illustrates an example of insulated DC/DC converter according to the invention.

FIG. 7 illustrates another example, similar to that in FIG. 2, whether this is not that the switches QA1, QA2 of the first primary side arm A are configured to function with a substantially constant duty cycle and that the insulated DC/DC converter 1 comprises a voltage converter circuit 130 configured to modify the voltage U delivered at the first primary side arm A to control the voltage Uo delivered by the insulated DC/DC voltage converter 1. The switches QA1, QA2 function with a duty cycle which does not vary, in other words, which remains constant over time. In the example in FIG. 7, the voltage converter circuit 130 is a step-down converter circuit. However, the voltage converter circuit 130 could be a step-up converter circuit, step-down/step-up, or two-directional. In particular, the duty cycle of the first primary side arm A can be equal to 50%. The voltage U at the terminals of the first primary side arm A is regulated at a voltage equal to 2N×Ue. At this duty cycle value, the drop in voltage at the terminals of the switches QB1, QB2, QC1, QC2 in the secondary part 120 of the insulated DC/DC converter 1 has the same value for all the switches. Thus, the switches QC1, QC2 open over the first functioning part and the switches QB1, QB2 open over the second functioning part have the same drop in voltage at the terminals thereof. The wear and tear of the secondary side switches is therefore the same.

Figure 8:
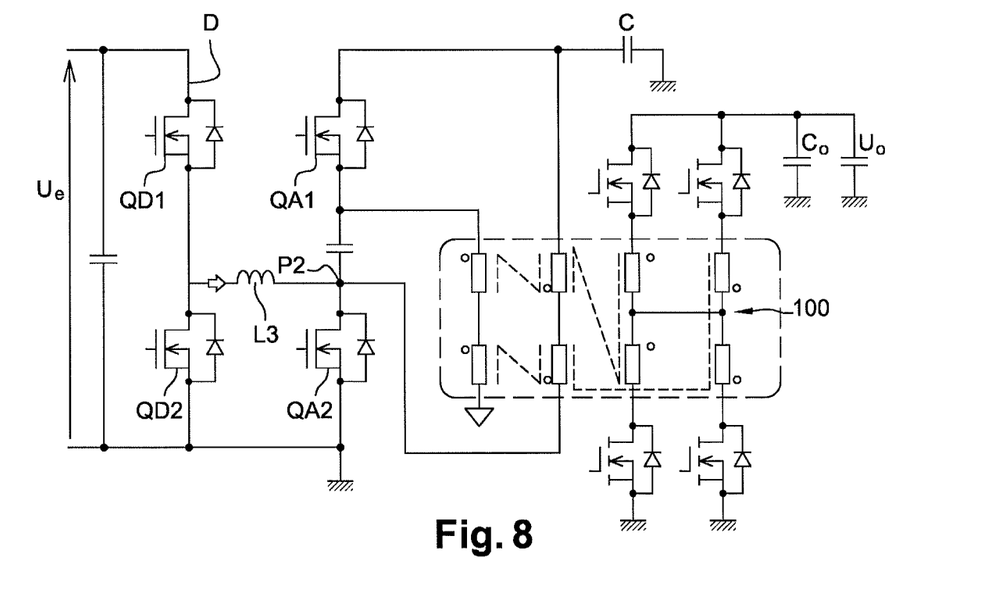
FIG. 8 illustrates another example of insulated DC/DC converter according to the invention.

FIG. 8 illustrates another example of an insulated DC/DC converter 1. The example of an insulated DC/DC converter 1 is similar to that illustrated in FIG. 6, except it further comprises other switches QD1, QD2 which control the output voltage Uo of the insulated DC/DC converter 1 by controlling the voltage seen by the switches QA1, QA2 of the first primary side arm A, the duty cycle of the switches QA1, QA2 of the first primary side arm A remaining constant. In particular, the switches QD1, QD2 control the voltage delivered by the switches QA1, QA2 of the first primary side arm A, for example, thanks to one or more inductances L3 and/or capacities to which they are connected. In particular, this example of an insulated DC/DC converter 1 comprises a second primary side arm D of switches in series. The second primary side arm D comprises two switches QD1, QD2 which are directly in series. A first switch QD1, referred to as high side breaker, is connected to the high terminal of a voltage source (not represented) delivering the input voltage Ue. A second switch QD2, referred to as low side breaker, is connected to the second end terminal of the first primary side arm A. The second switch QD2 is further connected to the low terminal of the voltage source. This low terminal therefore corresponds to the first ground GND1 of the insulated DC/DC converter 1. Each switch QD1, QD2 can comprise a transistor in parallel with a free-wheeling diode. An inductance L3 has a first terminal connected to the middle point of the second primary side arm D, and a second terminal connected to the second connecting point P2. A capacity C is connected between the end terminals of the first primary side arm A.

In the example illustrated in FIG. 2, the energy transmission through the magnetic component 100 is controlled by the switches QA1, QA2 of the first primary side arm A. In the example of an insulated DC/DC converter 1 illustrated in FIG. 8, the second primary side arm D also allows to control this energy transmission. The switches QA1, QA2 of the first primary side arm A function with a duty cycle which does not vary. During the functioning of the insulated DC/DC converter 1, the output voltage Uo is controlled by the current circulating in the third inductance L3. This current is controlled by the second primary side arm D. The switches QD1, QD2 of the second primary side arm D are controlled such that the current circulating in the third inductance L3 enables to obtain a desired voltage value Uo at the output of the insulated DC/DC converter 1. Thus, it is not necessary to make the duty cycle of the switches QA1, QA2 of the first primary side arm A vary. The first arm A can therefore function to the most advantageous duty cycle thereof for transmitting energy by the magnetic component 100, in particular at 50%. At a duty cycle of 50% in the first primary side arm A, as explained above in relation to the example in FIG. 7, the switches QC1, QC2 open over the first functioning part and the switches QB1, QB2 open over the second functioning part have the same drop in voltage at the terminals thereof. The wear and tear of the secondary side switches is therefore the same.

In particular, the magnetic component 100 illustrated in FIG. 2 can be produced by two transformers in series in which the secondaries are linked at an intermediate point as defined above. Alternatively, the primary part 110 of the magnetic component 100 can be produced with one single winding coupled with secondary windings producing the secondaries 120B, 120C, the secondaries being linked at an intermediate point as defined above.

Figure 9:
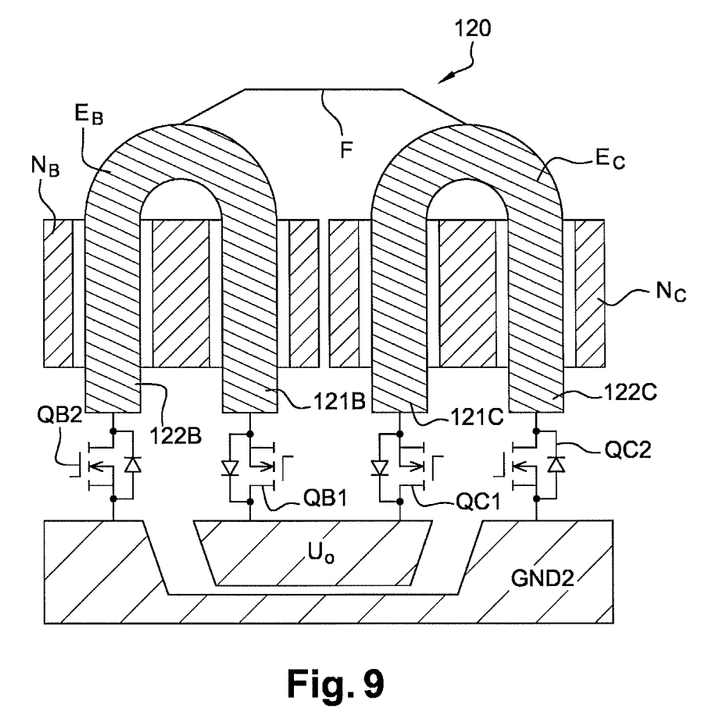
FIG. 9 illustrates an example of an embodiment of the secondary part of the magnetic component in an example of insulated DC/DC converter according to the invention.

FIG. 9 illustrates an example of implementing the secondary part 120 of the magnetic component 100 in an example of an insulated DC/DC converter 1 according to the invention. A first winding EB produces the secondary 120B of the first secondary side arm B. A second winding EC produces the secondary 120C of the second secondary side arm C. The windings EB, EC are wound over the respective cores NB, BC, by which they are respectively magnetically coupled to the first part 111 of the primary part 110 and to the second part 120 of the primary part 110. The windings EB, EC are linked to each other by a wire F at the intermediate points thereof.

The switches of the insulated DC/DC converter 1 can be transistors, such as MOSFET, IGBT transistors, or other transistors. One part, in particular all, of the insulated DC/DC converter 1 can be produced from a semi-conductive material such as silicon (Si), gallium nitride (GaN), silicon carbide (SiC), or any other semi-conductive material.

The invention is not limited to the examples defined. In particular, in the examples illustrated, the first primary side arm A and the primary part 110 of the magnetic component 100 form a half-bridge structure. However, the first primary side arm A and the primary part 110 could form a full-bridge structure with a fourth switch arm in series. The switches of the fourth arm are, for example, identical to those of the first primary side arm A.

The invention claimed is:
1. An insulated DC/DC converter comprising:
   a magnetic component having a primary part and a secondary part separated by an electrical insulation barrier;
   switches, referred to as primary side switches, linked to the primary part of the magnetic component such that the switching of the primary side switches with a duty cycle over modulation periods allows the magnetic component to transfer energy from the primary part to the secondary part and to store energy at the primary part, to convert an input voltage of the insulated DC/DC converter into an output voltage; and
   in which the secondary part of the magnetic component comprises a first arm and a second arm, each arm comprising a first switch, a secondary winding and a second switch in series, with the secondary winding between the first switch and the second switch; an intermediate point of the secondary winding of the first arm, referred to as first secondary winding, being connected to an intermediate point of the secondary winding of the second arm, referred to as second secondary winding, and in which said primary side switches are arranged in a first primary side arm connected to the primary part of said magnetic component, said first primary side arm comprising two switches (QA1, QA2) in series, a middle point between said two switches (QA1, QA2) of the primary side arm (A) being connected to an end of an arm which comprises the primary part (110) of the magnetic component (100), said insulated DC/DC converter further comprising a second primary side arm (D) including two switches (QD1, QD2) which are in series, an inductance (L3) having a first terminal connected to a middle point of said second primary side arm (D), and a second terminal connected to the middle point of the first primary side arm, and a capacity (C) being connected between the end terminals of the first primary side arm (A)

wherein the primary side arm is configured to function with a substantially constant duty cycle; and the secondary side arm is configured to control the output voltage of the insulated DC/DC converter by controlling the voltage delivered by said primary side switches of said primary side arm.

2. The converter according to claim 1, wherein the magnetic component transfers energy to one of the two secondary windings according to the input voltage applied at the level of the primary part.

3. The converter according to claim 2, wherein the magnetic component is configured such that:
over a first part of the modulation period, a first part of the primary part transfers an energy to the first secondary winding, and a second part of the primary part produces an inductance storing energy;
over a second part of the modulation period, the second part of the primary part transfers an energy to the second secondary winding, and the first part of the primary part produces an inductance storing energy.

4. The converter according to claim 3, wherein:
the switches of the first arm are configured to be looped over the first part of the modulation period and open over the second part of the modulation period; and
the switches of the second arm are configured to be looped over the second part of the modulation period and open over the first part of the modulation period.

5. The converter according to claim 1, wherein in each arm of the secondary part, the switches are configured to be simultaneously in a same state and to be in a different state from that of the switches of the other arm.

6. The converter according to claim 1, wherein the ends of the arms of the secondary part are linked to each other, a first end being configured to be connected to the ground of the secondary part, a second end being configured to be connected to the output of the converter.

7. The converter according to claim 1, wherein said secondary windings of the magnetic component are not magnetically coupled to each other, said secondary windings being magnetically coupled to the primary part.

8. The converter according to claim 1, wherein the primary side switches are configured to function with a substantially constant duty cycle; said converter comprising at least one other switch configured to control the output voltage of the insulated DC/DC converter by controlling the voltage delivered by said primary side switches.

9. The converter according to claim 8, wherein the primary side switches are configured such that the duty cycle thereof is substantially equal to 50%.

10. The converter according to claim 1, further comprising a short-circuit detector, configured to:
detect a short-circuit in one of said secondary side switches in the secondary part;
open the other switch of the secondary side arm to which the short-circuit switch belongs so as to neutralise this short-circuit.

11. The converter according to claim 1, wherein the magnetic component is configured such that:
over a first part of the modulation period, a first part of the primary part transfers an energy to the first secondary winding, and a second part of the primary part produces an inductance storing energy;
over a second part of the modulation period, the second part of the primary part transfers an energy to the second secondary winding, and the first part of the primary part produces an inductance storing energy.

12. The converter according to claim 11, wherein:
the switches of the first arm are configured to be looped over the first part of the modulation period and open over the second part of the modulation period; and
the switches of the second arm are configured to be looped over the second part of the modulation period and open over the first part of the modulation period.

13. The converter according to claim 12, wherein in each arm of the secondary part, the switches are configured to be simultaneously in a same state and to be in a different state from that of the switches of the other arm.

14. The converter according to claim 13, wherein the ends of the arms of the secondary part are linked to each other, a first end being configured to be connected to the ground of the secondary part, a second end being configured to be connected to the output of the converter.

15. The converter according to claim 14, wherein said secondary windings of the magnetic component are not magnetically coupled to each other, said secondary windings being magnetically coupled to the primary part.

16. The converter according to claim 1, wherein the primary side switches are configured such that the duty cycle thereof is substantially equal to 50%.

17. The converter according to claim 2, further comprising a short-circuit detector, configured to:
detect a short-circuit in one of said secondary side switches in the secondary part;
open the other switch of the secondary side arm to which the short-circuit switch belongs so as to neutralise this short-circuit.

18. The converter according to claim 11, further comprising a short-circuit detector, configured to:
detect a short-circuit in one of said secondary side switches in the secondary part;
open the other switch of the secondary side arm to which the short-circuit switch belongs so as to neutralise this short-circuit.

19. The converter according to claim 2, wherein said secondary windings of the magnetic component are not magnetically coupled to each other, said secondary windings being magnetically coupled to the primary part.

* * * * *